United States Patent
Armbruster

(10) Patent No.: US 12,296,518 B2
(45) Date of Patent: *May 13, 2025

(54) MOLD FOR INJECTION MOLDING

(71) Applicant: FOBOHA (GERMANY) GMBH, Haslach (DE)

(72) Inventor: Rainer Armbruster, Wolfach (DE)

(73) Assignee: FOBOHA (GERMANY) GMBH, Haslach (DE)

( * ) Notice: Subject to any disclaimer, the term of this patent is extended or adjusted under 35 U.S.C. 154(b) by 213 days.

This patent is subject to a terminal disclaimer.

(21) Appl. No.: 17/640,444

(22) PCT Filed: Aug. 17, 2020

(86) PCT No.: PCT/EP2020/072946
§ 371 (c)(1),
(2) Date: Mar. 4, 2022

(87) PCT Pub. No.: WO2021/073797
PCT Pub. Date: Apr. 22, 2021

(65) Prior Publication Data
US 2022/0324144 A1 Oct. 13, 2022

(30) Foreign Application Priority Data
Oct. 15, 2019 (CH) ........................................ 1315/19

(51) Int. Cl.
*B29C 45/26* (2006.01)
*B29C 45/04* (2006.01)

(52) U.S. Cl.
CPC ...... *B29C 45/2606* (2013.01); *B29C 45/0441* (2013.01); *B29C 45/2681* (2013.01)

(58) Field of Classification Search
None
See application file for complete search history.

(56) References Cited

U.S. PATENT DOCUMENTS

2014/0308388 A1* 10/2014 Armbruster ......... B29C 45/0441
425/577
2015/0093058 A1 4/2015 Hunt et al.
(Continued)

FOREIGN PATENT DOCUMENTS

CH 705140 A2 12/2012
WO WO 2015/158702 A1 10/2015

OTHER PUBLICATIONS

Hartwig, Tooling Corner: using Mold Insulation to reduce costs. <https://www.plasticstoday.com/tooling-corner-using-mold-insulation-reduce-costs> (Year: 2002).*
(Continued)

*Primary Examiner* — Armand Melendez
(74) *Attorney, Agent, or Firm* — CANTOR COLBURN LLP

(57) ABSTRACT

An injection molding device (1) having an injection molding machine and an injection mold (2) arranged therein. At least one first and at least one second outer mold half (3, 4) are arranged in a movable manner relative to each other in a first direction (x). A central part (5) that is arranged there between and comprises a lower part (6) an upper part (7) which are arranged rotatable about a rotational axis (8). The lower part (6) and the upper part (7) are separated from each other by a bearing arrangement (9) arranged between the upper part (7) and the lower part (6).

12 Claims, 3 Drawing Sheets

(56) References Cited

U.S. PATENT DOCUMENTS

2016/0121529 A1\* 5/2016 Armbruster .......... B29C 45/162
                                                        425/520
2017/0036379 A1\* 2/2017 Armbruster ......... B29C 45/1628

OTHER PUBLICATIONS

EPO (Riswijk, NL), English language version of the International Search Report, Form PCT/ISA/210, for International Application PCT/EP2020/072946, Oct. 15, 2020 (3 pages).

\* cited by examiner

MOLD FOR INJECTION MOLDING

BACKGROUND OF THE INVENTION

Cross Reference to Related Application

This application is a National Phase filing in the United States, under 35 USC § 371, of PCT International Patent Application PCT/EP2020/072946, filed on 17 Aug. 2020 which claims the priority of Swiss Patent Application CH 01315/19, filed 15 Oct. 2019.

These applications are hereby incorporated by reference herein in their entirety and is made a part hereof, including but not limited to those portions which specifically appear hereinafter.

Field of the Invention

The present disclosure applies to the field of tools and machines for injection molding of plastics and other thermoplastic materials.

Discussion of Related Art

Injection molding devices having a rotating central parts are known from the prior art, which are used to efficiently produce multi-component plastic parts through injection molding. A rotatable mold center part (center block), which is fixed to a holding device and is arranged so as to be able to rotate about a rotational axis, is arranged between two mold halves that are movable relative to one another along bars of an injection molding machine in a first direction. The rotatable mold center part has at least two parallel side surfaces, along which it interacts with the two mold halves to form cavities. Coordination means cause the rotatable mold center part to remain positioned centrally between the two mold halves during opening and closing, and thus collisions can be avoided. A variety of holding devices for the rotatable central part are known from the prior art.

For the production of more complex articles consisting of two or more assembled parts in the same injection molding device the following publication is known: WO2015158702A1 was published in October 2015 on behalf of the same applicant. It is directed to an injection molding device with at least one first and at least one second outer mold half, which are arranged in a movable manner relative to each other in a first direction. A central part which can be rotated about a rotational axis is arranged between the two mold halves, said central part is having a lower part and an upper part. First inner mold halves are attached in pairs to the lower part, and second inner mold halves are attached in pairs to the upper part. Said inner mold halves interact with the first and second outer mold halves, which are paired with the inner halves, in a closed position in order to form cavities. The first and the second inner mold halves and the paired first and second outer mold halves form a lower and an upper production plane.

SUMMARY OF THE INVENTION

An injection molding device according to the disclosure usually comprises an injection molding machine with a first mold clamping plate and a second mold clamping plate which are arranged movable relative to each other in a first direction along bars. The injection molding device comprises an injection mold which during operation is arranged in the injection molding machine. The injection mold comprises a first and a second outer mold half, which are each attached to the first, respectively the second mold clamping plate. They are thereby arranged movable relative to each other in the first direction. The first and the second outer mold half may comprise more than one type of cavities preferably grouped in sections. A central part is arranged between the first and the second outer mold half. It comprises a lower part and an upper part which are arranged rotatable about a rotational axis which usually is arranged perpendicular to the movement of the outer mold halves relative to each other along the bars in the first direction. Preferably the lower part and the upper part can be rotated independently from each other and thereby each is actuated by a separate drive train. Inner mold halves are attached to the lower part which in connection with the respective outer mold halves form cavities of a lower production plane. Inner mold halves are attached to the upper part, which in connection with the respective outer mold halves form cavities of an upper production plane. The lower part and the upper part are mechanically separated from each other by a bearing arrangement arranged between the upper part and the lower part. The bearing arrangement is preferably the only direct connection between the lower part and the upper part. It can be arranged in the center between the lower and the upper part. Alternatively, or in addition, it can have an annular design.

One advantage of the interconnection via the bearing arrangement is that the lower and the upper part are thermally spaced apart from each other by the bearing arrangement. The bearing arrangement can therefore be used as thermal decoupling, respectively thermal insulation between the lower and the upper part. Compared to the prior art, an advantage of this setup is that it allows to handle in each production plane strongly different materials which e.g., require different temperatures, cooling, etc.

When the lower and the upper part shall be rotatable independent from each other, the bearing arrangement usually comprises at least one radial bearing and if appropriate an axial bearing. The lower part and the upper part are supported with respect to each other in a rotatable manner about the rotational axis. The axial bearing can be foreseen to support the upper part by the lower part in the vertical direction. The bearing arrangement usually comprises a first bearing block, attached to the lower part and a second bearing block attached to the upper part. The at least one axial bearing and the at least one radial bearing are preferably arranged between the first and the second bearing block. Alternatively, or in addition, a bearing can be arranged directly between the lower and the upper part of the center part. The first bearing block and/or the second bearing block are preferably made from a material having a lower thermal conductivity then the material of the lower part and/or the upper part. In a preferred variation, the lower part and the upper part are separable from each other in the area of the bearing arrangement. Thereby, it becomes easily possible to lift off the upper part from the lower part in the vertical direction. This is very advantageous e.g., during assembly and maintenance. If appropriate, additional fixation means which interconnect the lower part and the upper part temporarily can be foreseen to stabilize the upper part with respect to the lower e.g., during transportation, etc. Good results can be achieved when the first and the second bearing block are interconnected to each other by a mechanical plug connection separable from each other in the direction of the rotational axis. If appropriate, the first and/or the second bearing block can be incorporated in the lower or the upper part of the center part.

For stable operation, the lower part is preferably held by a lower holding device, which comprises a lower coupling plate. The upper part is preferably held by an upper holding device comprising an upper coupling plate. Each coupling plate may comprise the same or a different standardized interface which during operation is interconnected to a corresponding standardized interface of the lower part, respectively the upper part. The standardized interface of the upper part is used to exchange liquids, such as cooling fluid as well as electrical power and energy with the upper holding device. The standardized interface of the lower part is used to exchange liquids, such as cooling fluid as well as electrical power and energy with the lower holding device. This design helps to improve the thermal separation between the lower part and the upper part.

In a preferred variation, the lower coupling plate is attached to a lower stub axle and the upper coupling plate is attached to an upper stub axle. Each stub axle during operation being arranged coaxial with respect to each other rotatable around the rotational axis. The lower stub axle is arranged in a lower bearing sleeve forming part of the lower holding device and the upper stub axle is arranged in an upper bearing sleeve forming part of the upper holding device by which the center part is held with respect to the injection molding machine. The lower coupling plate and the upper coupling plate can be arranged displaceable with respect to each other in the direction of the rotational axis.

It is to be understood that both the foregoing general description and the following detailed description present embodiments, and are intended to provide an overview or framework for understanding the nature and character of the disclosure. The accompanying drawings are included to provide a further understanding and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described disclosure will be more fully understood from the detailed description given herein below and the accompanying drawings which should not be considered limiting to the disclosure described in the appended claims. The drawings are showing:

DETAILED DESCRIPTION OF THE INVENTION

Reference will now be made in detail to certain embodiments, examples of which are illustrated in the accompanying drawings, in which some, but not all features are shown. Indeed, embodiments disclosed herein may be embodied in many different forms and should not be construed as limiting to the embodiments set forth herein; rather, these embodiments are provided so that this disclosure will satisfy applicable legal requirements. Whenever possible, like reference numbers will be used to refer to like components or parts.

Figure 1:
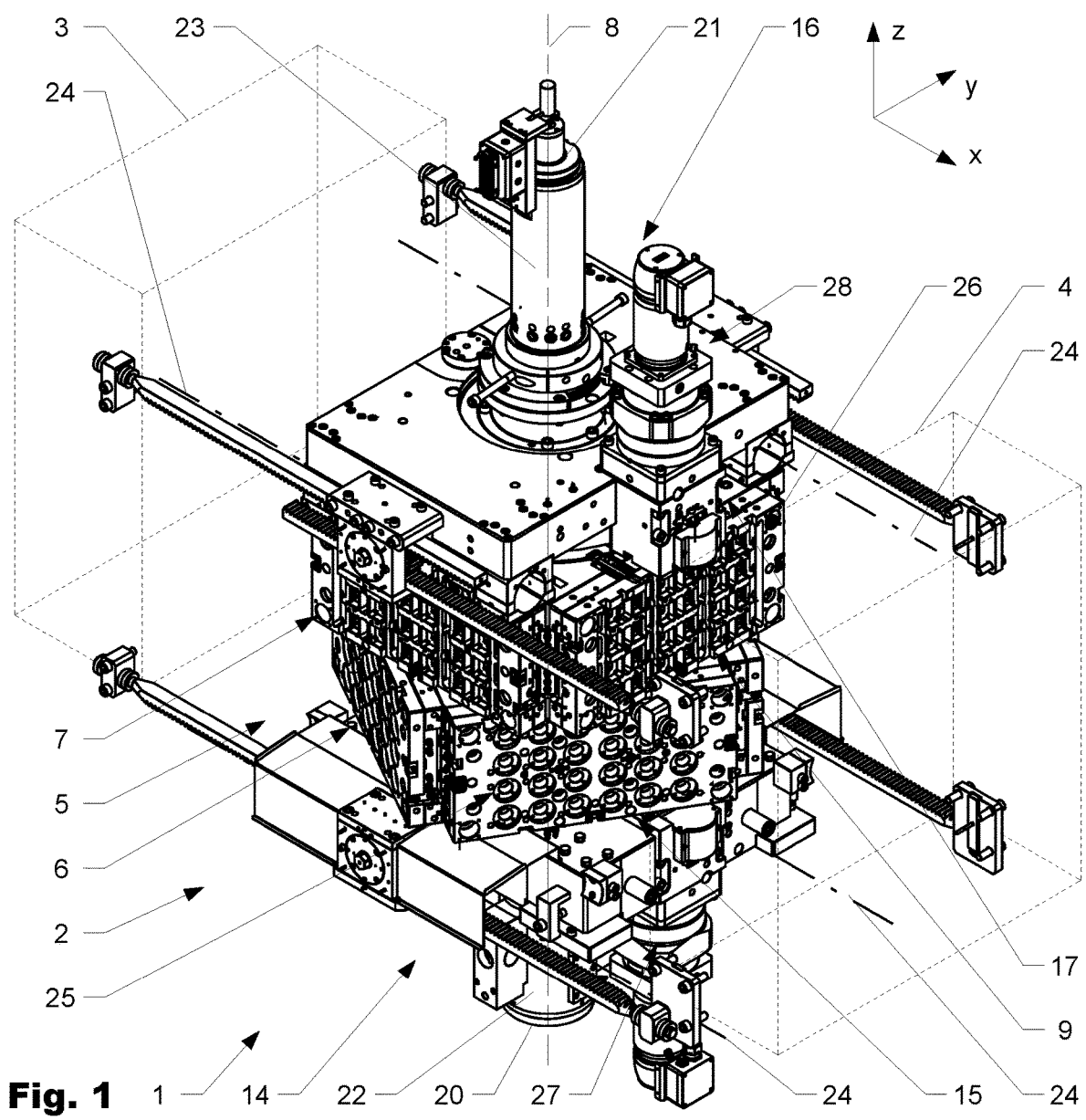
FIG. 1 shows an injection molding device according to the disclosure in a perspective view.
Figure 2:
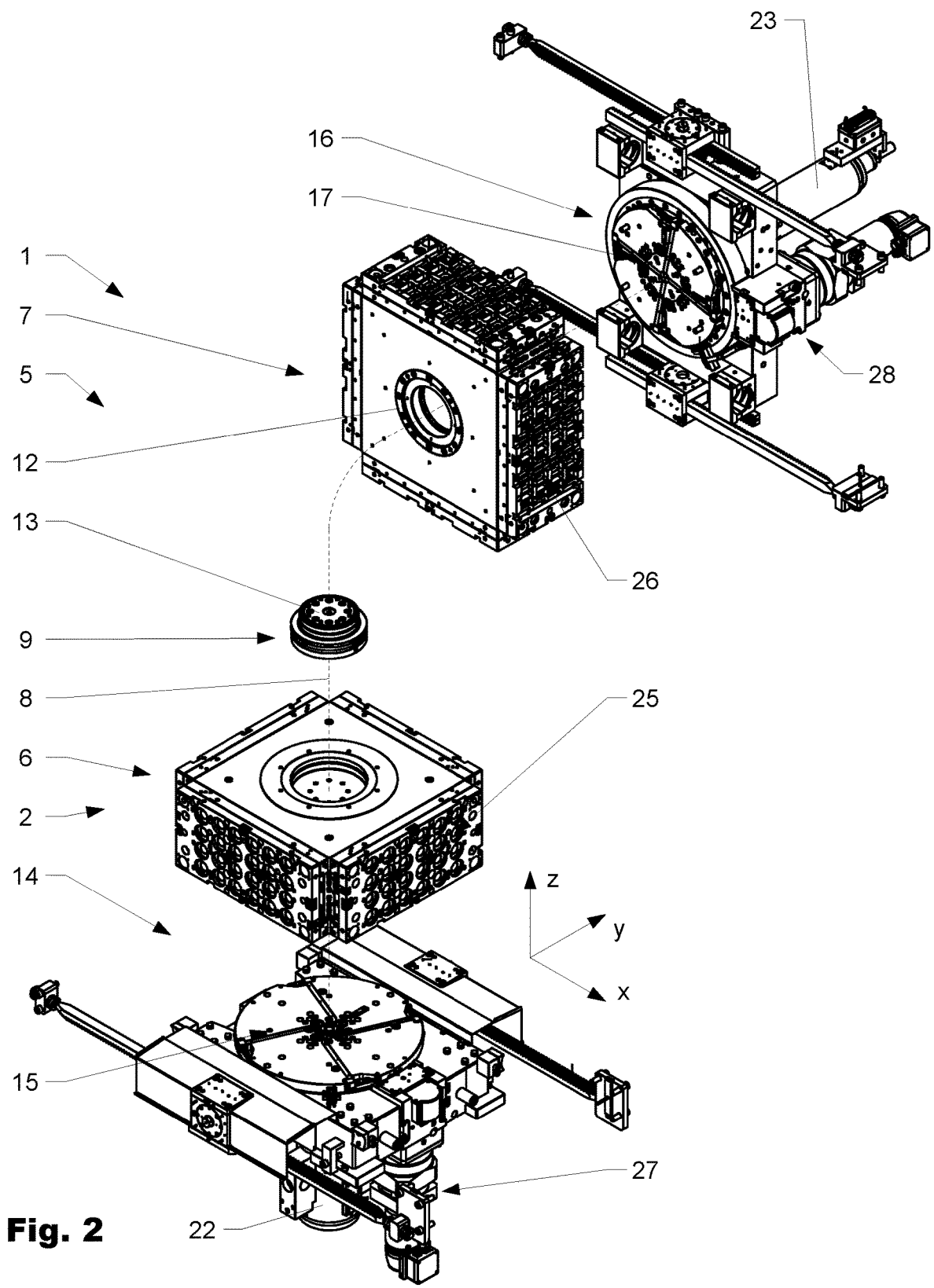
FIG. 2 shows the injection molding device according to FIG. 1 in an exploded view.
Figure 3:
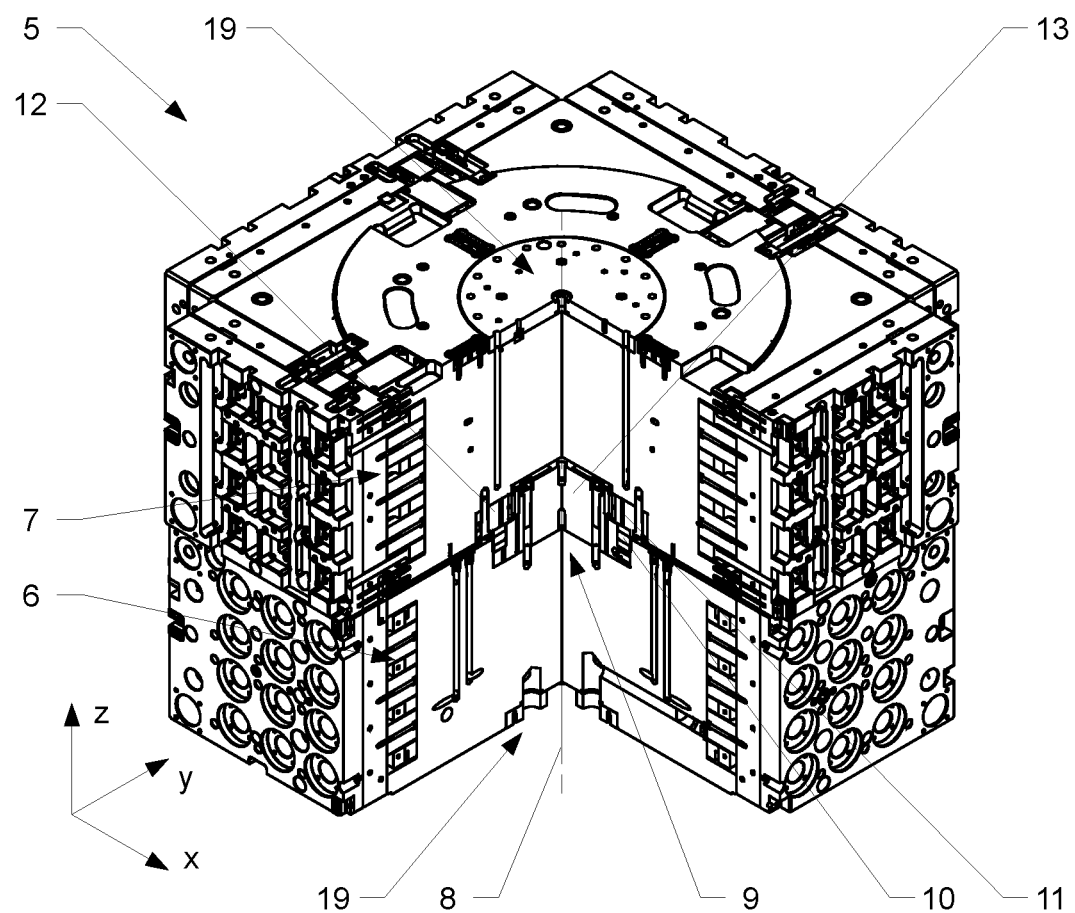
FIG. 3 shows a central part according to the disclosure in a segmented view.

FIG. 1 illustrates a variation of an injection molding device 1 according to the disclosure, in a perspective view and in an opened state, from obliquely above and in front. FIG. 2 illustrates elements of the same injection molding device 1 in an exploded manner in the direction of the dotted line. As can be seen, the upper part is put down laterally for better visibility of the elements described hereinafter in more detail. FIG. 3 illustrates a central part 5 of the injection molding device 1 in a section view. The drawings do not depict all of the parts of the injection molding device 1, but rather only the parts thereof that are essential for understanding the function of the present disclosure.

As best visible in FIG. 1 and FIG. 2, the injection molding device 1 comprises an lower holding device 14 and an upper holding device 16 for a multi-part rotatable central part 5 that during operation is arranged in the injection molding device 1 between a first and a second outer mold half 3, 4 (schematically indicated by dotted lines) that are movable relative to one another in a first direction (x-direction) along bars 24 (indicated by dash-dotted lines) of a commercially available injection molding machine (not shown in detail).

The outer mold halves 3, 4 are usually fastened to mold clamping plates of the injection molding machine, the outer mold halves 3, 4 being of a single- or multi-part design. In addition to the first and the second outer mold halves 3, 4, the injection mold 2 normally comprise first and second inner mold halves 25, 26 that are arranged opposite to one another in a paired manner on the lower part 6, respectively the upper part 7 of the rotatable central part 5. The first and the second inner mold halves 25, 26 interact with the first and second outer mold halves 3, 4 to form cavities (not shown) in a closed position of the injection molding device 1 for the production of parts (not shown).

The first inner mold halves 25 are attached to the lower part 6 and the second inner mold halves 26 are attached to the upper part 7 of the rotatable central part 5 of multi-part design. The lower part 6 and the upper part 7 are rotatably mounted about a rotational axis 8. They are usually having a block like structure made from metal, such as aluminium and/or steel. The lower part 6 and the upper part 7 usually are comprising cooling channels etc. on the inside necessary for conditioning of the cavities during injection molding. In the shown variation, the lower part 6 is actuated by a lower drive train 27 and the upper part is actuated by an upper drive train 28.

The lower part 6 and the upper part 7 are thermally spaced apart from each other by a bearing arrangement 9 arranged between the upper part 7 and the lower part 6 (see e.g., section view according to FIG. 3). The bearing arrangement 9 preferably comprises an axial bearing 10 and a radial bearing 11 by which the lower part 6 and the upper part 7 are rotatable with respect to each other about the rotational axis 8. In addition, the upper part 7 may be supported in the vertical direction by the lower part 6.

Good results can be achieved when a first bearing block 12 is interconnected to the lower part 6 and a second bearing block 13 is attached to the upper part 7. The axial bearing 10 and the radial bearing 11 are preferably arranged between first and the second bearing block 12, 13 supporting the lower part 6 and the upper part 7 with respect to each other. In that the first bearing block 12 and/or the second bearing block 13 are made from a material which is having a lower thermal conductivity then the material of the lower part 6 and/or the upper part 7 of the central part 5.

E.g., for maintenance reasons, the lower part 6 and the upper part 7 are preferably separable from each other in the area of the bearing arrangement 9. The first and the second bearing block 12, 13 can be interconnected to each other by a plug connection preferably separable from each other in the direction of the rotational axis 8.

Preferably, the lower part 6 is held by a lower holding device 14 comprising a lower coupling plate 15 and the upper part 7 is held by an upper holding device 16 comprising an upper coupling plate 17. Each coupling plate 15, 17 may comprise a standardized interface 18 which, during operation, is interconnected to a corresponding standardized interface 19 of the lower part 6 respectively the upper part 7. The standardized interfaces can be e.g., used to exchange cooling liquid in one or several circuits. Preferably the standardized interfaces 18, 19 comprise means to transfer electrical power and data.

In the shown variation, the lower coupling plate 15 is attached to a lower stub axle 20 and the upper coupling plate 17 is attached to an upper stub axle 21. Each stub axle 20, 21 during operation being arranged coaxial with respect to each other rotatable around the rotational axis 8. The lower stub axle 20 is arranged in a lower bearing sleeve 22 attached to the lower holding device 14 and the upper stub axle 21 is arranged in an upper bearing sleeve 23 interconnected to the upper holding device 16.

Rather, the words used in the specification are words of description rather than limitation, and it is understood that various changes may be made without departing from the Spirit and scope of the disclosure.

The invention claimed is:

1. An injection molding device (1) comprising an injection molding machine and
  a. an injection mold (2) arranged in the injection molding machine, with at least one first and at least one second outer mold half (3, 4), which are arranged in a movable manner relative to each other in a first direction (x), and
  b. a central part (5) that is arranged therebetween and comprises a lower part (6) and an upper part (7) which are arranged rotatable about a rotational axis (8), wherein
  c. the lower part (6) and the upper part (7) are connectable to each other by a bearing arrangement (9) arranged between the upper part (7) and the lower part (6), the lower part (6) and the upper part (7) being rotatable about the rotational axis (8) via the bearing arrangement (9), and wherein the bearing arrangement (9) comprises a first bearing block (12) attached to the lower part (6) and a second bearing block (13) attached to the upper part (7).

2. The injection molding device (1) according to claim 1, wherein the bearing arrangement (9) comprises an axial bearing (10) and a radial bearing (11) by which the lower part (6) and the upper part (7) are rotatable with respect to each other about the rotational axis (8) and wherein the upper part (7) is supported in the vertical direction (z) by the lower part (6).

3. The injection molding device (1) according to claim 2, wherein the axial bearing (10) and the radial bearing (11) are arranged between the first bearing block (12) and the second bearing block (13) supporting the lower part (6) and the upper part (7) with respect to each other.

4. The injection molding device (1) according to claim 3, wherein the lower part (6) and the upper part (7) are separable from each other in the area of the bearing arrangement (9).

5. The injection molding device (1) according to claim 4, wherein the first and the second bearing block (12, 13) are interconnected to each other by a plug connection separable from each other in the direction of the rotational axis (8).

6. The injection molding device according to claim 1, wherein the lower part (6) is held by a lower holding device (14) comprising a lower coupling plate (15) and the upper part (7) is held by an upper holding device (16) comprising an upper coupling plate (17), wherein each coupling plate (15, 17) comprises a standardized interface (18) which during operation is interconnected to a corresponding standardized interface (19) of the lower part (6) and the upper part (7), respectively.

7. The injection molding device (1) according to claim 6, wherein the lower coupling plate (15) is attached to a lower stub axle (20) and the upper coupling plate (17) is attached to an upper stub axle (21), each stub axle (20, 21) during operation being arranged coaxial with respect to each other rotatable around the rotational axis (8).

8. The injection molding device (1) according to claim 7, wherein the lower stub axle (20) is arranged in a lower bearing sleeve (22) interconnected to the lower holding device (14) and the upper stub axle (21) is arranged in an upper bearing sleeve (23) interconnected to the upper holding device (16).

9. The injection molding device (1) according to claim 6, wherein the lower coupling plate (15) and the upper coupling plate (17) are arranged displaceable with respect to each other in the direction of the rotational axis (8).

10. The injection molding device (1) according to claim 1, wherein the first bearing block (12) and/or the second bearing block (13) are made from a material having a lower thermal conductivity then the material of the lower part (6) and/or the upper part (7).

11. An injection molding device (1) comprising an injection molding machine and
  a. an injection mold (2) arranged in the injection molding machine, with at least one first and at least one second outer mold half (3, 4), which are arranged in a movable manner relative to each other in a first direction (x),
  b. a central part (5) that is arranged therebetween and comprises a lower part (6) and an upper part (7) which are independently rotatable about a rotational axis (8), the lower part (6) and the upper part (7) being spaced apart from one another; and
  c. a bearing arrangement operably coupled to both the lower part (6) and the upper part (7), the upper part (7) being removably connectable to the lower part (6) by the bearing arrangement, wherein the bearing arrangement defines the rotational axis and both the lower part and the upper part (7) are rotatable about the rotational axis via the bearing arrangement.

12. The injection molding device of claim 11, wherein the bearing arrangement includes both an axial bearing and a radial bearing.

* * * * *